United States Patent
Grabau et al.

(10) Patent No.: US 8,915,714 B2
(45) Date of Patent: Dec. 23, 2014

(54) WIND TURBINE AND WIND TURBINE BLADE

(75) Inventors: Peter Grabau, Kolding (DK); Michael Friedrich, Silkeborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 521 days.

(21) Appl. No.: 13/456,735

(22) Filed: Apr. 26, 2012

(65) Prior Publication Data

US 2012/0294723 A1 Nov. 22, 2012

(30) Foreign Application Priority Data

Apr. 29, 2011 (DK) ................................. 2011 70209

(51) Int. Cl.
 *F03D 1/06* (2006.01)
 *F03D 7/02* (2006.01)

(52) U.S. Cl.
 CPC ............ *F03D 7/0228* (2013.01); *Y02E 10/721* (2013.01); *F03D 7/0232* (2013.01); *F03D 7/0256* (2013.01); *Y02E 10/723* (2013.01); *F03D 1/0641* (2013.01); *F03D 1/0675* (2013.01); *Y10S 415/908* (2013.01); *Y10S 415/914* (2013.01)
 USPC .................. 416/132 B; 416/153; 416/210 R; 416/231 B; 415/4.3; 415/4.5; 415/140; 415/908; 415/914

(58) Field of Classification Search
 CPC ... F03D 1/0641; F03D 1/0675; F03D 7/0228; F03D 7/0256; F03D 7/0232
 USPC ........ 415/4.3, 4.5, 140, 908, 914; 416/132 B, 416/153, 210 R, 232, 231 R, 231 B, 239
 See application file for complete search history.

(56) References Cited

U.S. PATENT DOCUMENTS

| | | | | |
|---|---|---|---|---|
| 2,074,149 | A | * | 3/1937 | Jacobs ............................. 416/88 |
| 4,297,076 | A | * | 10/1981 | Donham et al. ................. 416/37 |
| 4,355,955 | A | | 10/1982 | Kisovec |
| 4,533,297 | A | * | 8/1985 | Bassett ...................... 416/132 B |

(Continued)

FOREIGN PATENT DOCUMENTS

| | | |
|---|---|---|
| CN | 101198788 A | 6/2008 |
| DE | 917 540 C | 9/1954 |
| WO | 2009/080316 A2 | 7/2009 |

OTHER PUBLICATIONS

Danish Patent and Trademark Office Search Report for Application No. PA 2011 70210 Dated Jan. 13, 2012.

(Continued)

*Primary Examiner* — Igor Kershteyn
(74) *Attorney, Agent, or Firm* — Roberts Mlotkowski Safran & Cole, P.C.; David S. Safran (57) ABSTRACT

A partial pitch wind turbine is described wherein the wind turbine blade has an inner blade section designed for stall-controlled operation and an outer blade section designed for pitch-controlled operation. The different blade profiles for the different sections allow for the efficient operation of the blade while providing for the control of the wind turbine to effectively reduce blade root moments. The outer blade sections can be pitched out of the wind to reduce root moments due to the outer blade sections, while the increasing power capture of the inner blade section maintains nominal power output.

15 Claims, 3 Drawing Sheets

(56) References Cited

U.S. PATENT DOCUMENTS

| | | | |
|---|---|---|---|
| 4,715,782 A | | 12/1987 | Shimmel |
| 5,253,979 A | * | 10/1993 | Fradenburgh et al. .... 416/223 R |
| 6,902,370 B2 | | 6/2005 | Dawson et al. |
| 7,186,086 B2 | * | 3/2007 | Yoshida ................ 416/146 R |
| 7,994,650 B2 | | 8/2011 | Stommel |
| 2006/0093483 A1 | * | 5/2006 | Brueckner ............. 416/132 B |
| 2008/0124216 A1 | * | 5/2008 | Liao ........................... 416/24 |
| 2010/0260603 A1 | | 10/2010 | Dawson et al. |
| 2010/0266408 A1 | | 10/2010 | Dawson et al. |

OTHER PUBLICATIONS

Ervin Bossanyi, Project Upwind, Integrated Wind Turbine Design, Work Package 5—Control Systems: Final Report. Document No. 11593/BR/10, Dated Feb. 10, 2010. Retrieved From the Internet at URL http://www.upwind.eu/pdf/D.5.10%20Work%20Package%205%20Control%20systems%20-%20Final%20report.pdf. Retrieved on Jan. 13, 2012. See in Particular pp. 22-24.

\* cited by examiner

WIND TURBINE AND WIND TURBINE BLADE

BACKGROUND OF THE INVENTION

1. Field of the Invention

The present invention relates to a wind turbine blade and an associated wind turbine, in particular a partial-pitch wind turbine blade.

2. Description of Related Art

During wind turbine operation, significant loads are experienced at the root ends of the wind turbine blades as the blades rotate under operation from aerodynamic forces. Such fatigue loads produce considerable stresses and strains in the wind turbine structure, requiring significant design limitations regarding the strength of the materials used in turbine construction, reinforcement, etc. Accordingly, it is of interest to develop particular wind turbine designs which can reduce such loads, providing for reduced design limitations for the overall turbine construction.

One particular wind turbine blade construction is a partial pitch wind turbine blade. A partial pitch wind turbine comprises a plurality of wind turbine blades having inner and outer blade sections. The outer blade sections are pitchable relative to the inner blade sections, such that the output power of the wind turbine can be controlled to maintain rated power output for different wind speeds. Examples of partial pitch wind turbines include the Danish Nibe A wind turbine, and the MOD-2 wind turbine developed by NASA.

Similarly in the patent literature, partial pitch blades have been described. This includes German Application DE 91754 and U.S. Pat. No. 7,994,650 B2 and which discloses a partial pitch wind turbine with an inner blade section and an outer blade section pitchable relative to each other.

Common to these partial pitch wind turbine blades is that they have an aerodynamic profile that changes continuously along the blade even when the inner blade section and the outer blade section are aligned to the greatest possible.

That is that the partial pitch blade presents a single continuous blade profile when the outer sections are unpitched (providing a consistent full-span blade profile), and during high wind conditions the outer blade sections may be feathered to reduce extreme loads. However, partial pitch blades continue to experience significant fatigue loads during normal operation.

SUMMARY OF THE INVENTION

It is an object of the invention to provide a new partial pitch wind turbine blade and associated wind turbine which further reduces the negative effects of wind loading while providing for efficiency of operation.

It is an object of the invention to provide how to provide a wind turbine blade that more efficiently can be operated or controlled while providing reduced root moments.

And it is a further object of the invention—at the same time—to provide for increasing power production of the inner blade sections for substantially all of the nominal power output wind speed range.

Accordingly, there is provided a partial pitch wind turbine blade of at least 35 meters length, the blade comprising:

an inner blade section;

an outer blade section coupled to said inner blade section at a pitch junction, said outer blade section operable to pitch relative to said inner blade section, wherein said inner blade section comprises a first blade profile for a stall-controlled aerodynamic blade, wherein said outer blade section comprises a second blade profile for a pitch-controlled aerodynamic blade, and wherein said blade comprises a discontinuity between said first and second blade profiles at said pitch junction.

In particular there is provided a partial pitch wind turbine blade of at least 35 meters length, the blade comprising an inner blade section;

an outer blade section coupled to said inner blade section at a pitch junction, said outer blade section operable to pitch relative to said inner blade section, wherein said inner blade section comprises a first blade profile for a stall-controlled aerodynamic blade with a first aerodynamic profile having a first maximum lift coefficient (CLmax1) and a first cord (Ch1) at the end facing said pitch junction and wherein said outer blade section comprises a second blade profile for a pitch-controlled aerodynamic blade with a second aerodynamic profile having a second maximum lift coefficient (CLmax2) and a second cord (Ch2) at the end facing said pitch junction, and wherein said blade comprises a discontinuity between said first and second (20) blade profiles between said pitch junction, which discontinuity is such that $[(CLmax1) \times (Ch1)]$ is at least 20% greater than $[(CLmax2) \times (Ch2)]$.

Thereby the inner section is designed for stall control, and the outer section is designed for pitch control, the partial pitch blade provides the best performance for partial pitch operation, while minimising root loads of the blade.

It has further been found that for a blade with a discontinuity in aerodynamic profiles as claimed, the need of a full transition area is not required thereby providing a blade that more clearly has the stall features and the pitch features and hence allows for a sharper or more precise control.

Furthermore, the discontinuity in the $[(CLmax) \times (Chord)]$ values of the two blade sections provides for a blade configuration which is adapted for use an appropriate control method to pitch the outer blade sections out of the wind at nominal power output, wherein the inner blade section continues to produce increasing lift (and therefore increasing power generation) as wind speed increases beyond the wind speed at which the blade produces nominal rated power. It has been found that the $[(CLmax) \times (Chord)]$ variation aims ensures that stall of the inner blade sections is suppressed for as long as possible, in order to provide for increasing power production of the inner blade sections for substantially all of the nominal power output wind speed range.

As the inner section is designed for stall control, and the outer section is designed for pitch control, the partial pitch blade provides the best performance for partial pitch operation, while minimising root loads of the blade. As wind speed increases, the outer blade section can be pitched out of the wind, with power production transitioning from the outer blade section to the inner blade section. The reduced blade moments provided by increased power generation at the inner blade section results in reduced root loads, and consequently reduced fatigue loads in the wind turbine structure. The use of a discontinuity or jump between the different blade profiles at the pitch junction means that a full transition area is not required between the blade sections, which may impact on the efficiency of the full blade.

Preferably, the discontinuity is provided between the level of the surface of the blade sections at the pitch junction. While the cross-sectional profile of the blade sections at the pitch junction may overlap to an extent, they do not line up in register exactly with each other. Accordingly, a discontinuity or jump will be seen in the surface of the blade when looking along the longitudinal length of the blade from the tip end of the blade.

A blade profile for pitch control is optimised for performance within a short range of angles of attack, and can have a relatively large camber, while a stall-controlled aerodynamic blade has a general all-round performance, and a good lift-to-drag ratio, combined with a relatively slight camber. Suitable aerodynamic profiles for the inner stall-controlled blade section include, but are not limited to, NACA-63-2XX blade profiles. Suitable aerodynamic profiles for the outer pitch-controlled blade section include, but are not limited to, NACA-63-6XX blade profiles.

Preferably, said inner blade section is designed to enter stall for a greater angle of attack than said outer blade section.

As the inner blade section enters stall at a greater angle of attack (e.g. at a higher wind speed) than the outer blade section, accordingly as wind speed increases for the blade proportionally more power can be produced by the inner blade section. This provides for a reduction in the blade root moments of the partial pitch blade during operation. Preferably, said inner blade section has a first aerodynamic profile having a first maximum lift coefficient (CLmax1) and a first chord (Ch1) at said pitch junction, said outer blade section has a second aerodynamic profile having a second maximum lift coefficient (CLmax2) and a second chord (Ch2) at said pitch junction, and wherein

[(CLmax1)×(Ch1)] is at least 20% greater than [(CLmax2)×(Ch2)].

As [(CLmax)×(Chord)] is proportional to the power production of a wind turbine blade, the discontinuity in power production provides for a partial pitch blade which can be efficiently operated while providing for reduced root moments. While it is more efficient to produce power from the outer blade sections (i.e. due to their greater swept area), as wind speed increases beyond nominal output power production of a wind turbine the blade production efficiency reduces in importance, and focus is directed towards reducing the blade moments. Accordingly, as wind speed increases, more power can be produced by the inner blade sections, which provides for reduced blade root moments (due to the reduced distance from the root of the blade).

It will be understood that the chord lengths can be measured at the respective ends of the inner and outer blade sections at the pitch junctions. In another aspect of the invention, the chord length may be measured as the average chord for a portion of the blade section adjacent the pitch junction, for example the average chord for the portion of the blade section within 1 meter of the pitch junction. Other portions may be measured for the average chord length at the pitch junction, e.g. 5 meters from the pitch junction, 10 meters, etc.

Preferably, the profile of said outer blade section has a greater camber than the profile of said inner blade section.

Additionally or alternatively, at least one high-lift device is provided on said inner blade section to suppress stall of said inner blade section.

The inner blade section may be shaped to provide a greater [(CLmax)×(Chord)] than the outer blade section, and/or the inner blade section may comprise any suitable arrangement of lift-generating devices in order to improve the lift of the inner blade section, and to delay stall of the inner blade section such that more power production may be transferred to the inner section during operation.

Preferably, said at least one high-lift device is selected from one or more of the following: a vortex generator, a gurney flap, a spoiler, a leading-edge slat/slot, boundary-layer control devices.

Preferably, the wind turbine blade comprises at least one stall fence provided at said pitch junction.

The use of a stall fence at the pitch junction allows for the airflows over the pitch-controlled and the stall-controlled sections to be separated from one another, such that the blade operation is unhindered by any blade cross span flow.

Preferably, the surface area of said inner blade section is substantially equivalent to the surface area of said outer blade section.

Preferably, the longitudinal length of said inner blade section is approximately equal to half the longitudinal length of said outer blade section.

There is also provided a partial pitch wind turbine comprising:
 a wind turbine tower;
 a nacelle provided at the top of said tower; and
 at least two partial pitch rotor blades as described above provided on a rotor hub located at said nacelle,
 wherein when the outer blade sections are unpitched relative to the inner blade sections of said partial pitch rotor blades said wind turbine is operable to generate nominal output power at a first wind speed, and wherein the inner blade sections are designed to enter stall at a second wind speed greater than said first wind speed.

Preferably, the wind turbine further comprises a controller, the controller operable to pitch said outer blade sections out of the wind for wind speeds above said first wind speed, as the power capture of said inner blade sections increases between said first wind speed and said second wind speed.

As the outer blade sections can be pitched out of the wind, the blade root moments associated with the power production of the outer blade sections can be reduced. While it can be more efficient to produce power from the outer blade sections (i.e. due to their greater swept area), as wind speed increases beyond nominal output power production of a wind turbine the blade production efficiency reduces in importance, and focus is directed towards reducing the blade moments. Accordingly, as wind speed increases, more power can be produced by the inner blade sections, which provides for reduced blade root moments (due to the reduced distance from the root of the blade).

It will be understood that the controller may comprise a self-contained control module present in the wind turbine structure at the location of the wind turbine, or may comprise a communications link to a remote control centre, operable to instruct the controller of the wind turbine to reduce the power capture of said outer blade sections for wind speeds above said first wind speed.

Preferably, said controller is operable to pitch said outer blade sections out of the wind to maintain nominal output power for wind speed above said first wind speed.

Nominal output power is maintained due to the increasing power capture or production of the inner blade sections.

Additionally or alternatively, there is provided a partial pitch wind turbine blade of at least 35 meters length having a blade root and a blade tip, the blade comprising:
 an inner blade section provided at the blade root;
 an outer blade section provided at the blade tip and coupled to said inner blade section at a pitch junction, said outer blade section operable to pitch relative to said inner blade section, wherein, from the blade root along the longitudinal length of the blade, the distal ⅔ of said inner blade section has an average chord length of C1 and the distal ⅔ of said outer blade section has an average chord length of C2, and wherein the length of C1 is greater than or equal to twice the length of C2.

It will be understood that the aerodynamic profile of said inner blade section may comprise a flat back profile or a truncated profile.

The use of such truncated profiles provides similar aerodynamic properties regarding lift, etc., but normally leading to increased noise levels. However, as the inner blade sections operate at relatively low speeds (due to the reduced sweep distance), the noise levels are not excessive for use in this application.

When looking from the root of the partial pitch blade, the outer ⅔ of the inner blade section (i.e. the section adjacent the pitch junction of the blade) has a first average chord length, and the outer ⅔ of the outer blade section (i.e. the section adjacent the tip end of the partial pitch rotor blade) has a second average chord length. The chord of the inner blade section is at least twice as long as the chord for the outer blade section. As a result, the inner blade section has a good lift-to-drag ratio compared with the outer blade section, and is able to produce more lift at higher wind speeds than the other blade section, allowing for proportionally more power to be produced by the inner blade section at higher speeds. Such an arrangement allows for the blade root moments experienced by a wind turbine to be reduced during turbine operation. It will be understood that a blade of such configuration may be used in addition to or alternatively to any of the other features described herein.

Additionally or alternatively, the blade may comprise at least one transition zone provided between said first and second blade profiles at said pitch junction.

The use of a transition zone allows for the coupling between the inner and outer blade sections to be standardised, e.g. for coupling to a suitable pitch system.

In one aspect, said outer blade section comprises an outer tip end and an inner pitch end, and wherein the blade further comprises an outer blade transition zone provided between the inner pitch end of said outer blade section and said pitch junction, wherein the blade comprises a discontinuity between the first blade profile at said pitch junction and the second blade profile at the inner pitch end of said outer blade section.

In an additional or alternative aspect, said inner blade section comprises an outer pitch end and an inner root end, and wherein the blade further comprises an inner blade transition zone provided between the outer pitch end of said inner blade section and said pitch junction, wherein the blade comprises a discontinuity between the first blade profile at the outer pitch end of said inner blade section and the second blade profile at the pitch junction.

The outer and/or inner transition zone is preferably a tapered element which transitions from the pitch controller profile of the outer/inner blade sections to a profile suitable for coupling to a pitch system used in a partial pitch wind turbine blade. The outer and/or inner transition zone may be provided as a shell element which is fitted over a section of the outer/inner blade section, or may be provided as a separate blade element mounted between the outer/inner blade section and the pitch system.

For these embodiments, when measuring chord Ch1 and chord Ch2, preferably the chord is measured from the end of the inner/outer blade section adjacent the inner/outer transition zone.

Preferably, the longitudinal length of the outer transition zone is approximately 20% of the longitudinal length of the outer blade section. Preferably, the longitudinal length of the inner transition zone is approximately 20% of the longitudinal length of the inner blade section.

Most preferably, there is provided a partial pitch wind turbine blade of at least 35 m length, the blade comprising:
an inner blade section;
an outer blade section coupled to said inner blade section at a pitch junction, said outer blade section operable to pitch relative to said inner blade section, wherein
said inner blade section has a first aerodynamic profile having a first maximum lift coefficient (CLmax1) and a first chord (Ch1) at said pitch junction, and
said outer blade section has a second aerodynamic profile having a second maximum lift coefficient (CLmax2) and a second chord (Ch2) at said pitch junction, and wherein
[(CLmax1)×(Ch1)] is at least 20% greater than [(CLmax2)×(Ch2)].

Similarly, there is also provided a partial pitch wind turbine comprising:
a wind turbine tower;
a nacelle provided at the top of said tower; and
at least two partial pitch rotor blades of at least 35 meters length provided on a rotor hub located at said nacelle, said rotor blades comprising an inner blade section mounted to said rotor hub and an outer blade section pitchable relative to said inner blade section,
wherein when said outer blade sections are unpitched relative to said inner blade section said wind turbine is operable to generate nominal output power at a first wind speed, and wherein said inner blade sections are designed to enter stall at a second wind speed greater than said first wind speed, wherein said outer blade sections are coupled to said inner blade sections at a pitch junction of said partial pitch rotor blades, wherein
said inner blade section comprises a first aerodynamic profile having a first maximum lift coefficient (CLmax1) and a first chord (Ch1) at said pitch junction, and
said outer blade section comprises a second aerodynamic profile having a second maximum lift coefficient (CLmax2) and a second chord (Ch2) at said pitch junction, and wherein
[(CLmax1)×(Ch1)] is at least 20% greater than [(CLmax2)×(Ch2)].

DESCRIPTION OF THE INVENTION

Embodiments of the invention will now be described, by way of example only, with reference to the accompanying drawings, in which.

BRIEF DESCRIPTION OF THE DRAWINGS

DETAILED DESCRIPTION OF THE INVENTION

Figure 1:
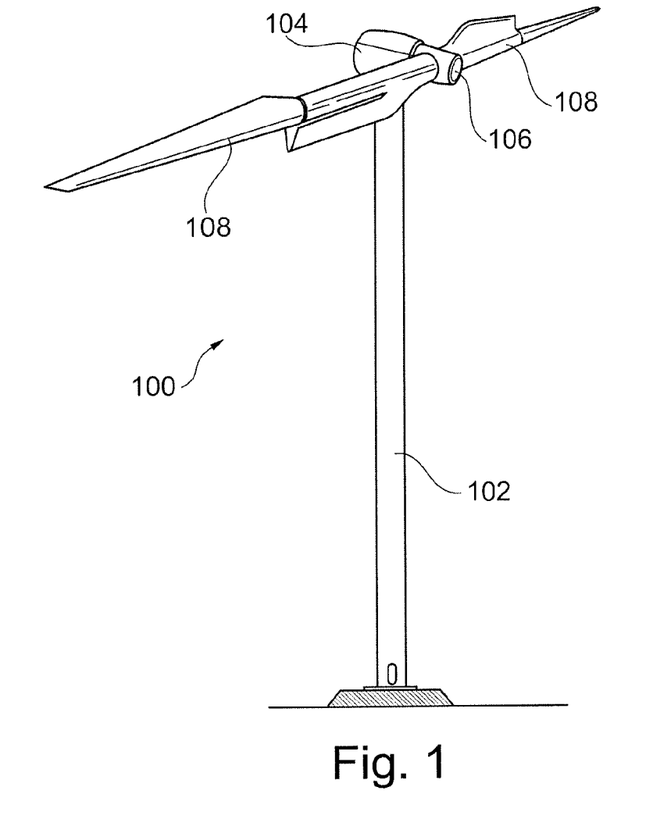
FIG. 1 is a perspective view of a partial pitch wind turbine comprising a rotor blade according to the invention.
Figure 2:
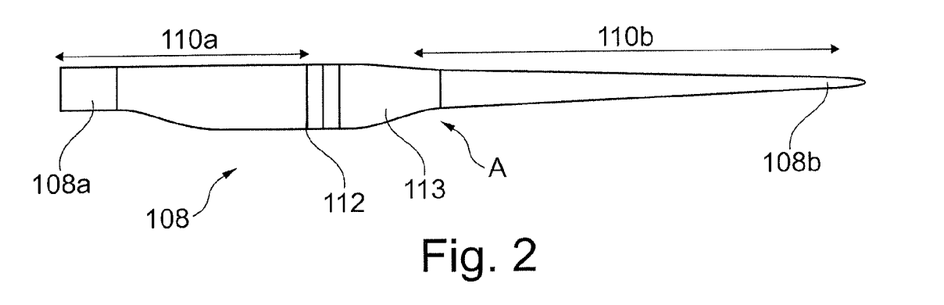
FIG. 2 is a plan view of a partial pitch rotor blade according to an aspect of the invention.

With reference to FIGS. 1 and 2, a wind turbine according to the invention is indicated generally at 100. The wind turbine 100 comprises a wind turbine tower 102, a nacelle 104 provided at the top of said tower 102, and a rotor hub 106 provided at said nacelle 104. A pair of partial pitch rotor blades 108 are provided on said rotor hub 106.

With reference to FIG. 2, the rotor blades 108 comprise a blade body having a root end 108*a* mounted to said rotor hub 106 and a distal tip end 108*b*. The rotor blades 108 comprise an inner blade section 110*a* provided at said root end 108*a*, and an outer blade section 110*b* provided at said tip end 108*b*. The rotor blades 108 further comprise a pitch system 112 provided at the junction between the inner blade section 110*a* and the outer blade section 110*b*. The pitch system 112 is operable to pitch the outer blade section 110*b* relative to the inner blade section 110*a*.

The inner blade section 110*a* and the outer blade section 110*b* are designed to have different and distinct blade aerodynamic profiles, such that the blade sections may operate in a different manner and have different power curve characteristics.

In the system of the invention, the inner blade section 110*a* is designed as a stall-controlled blade, while the outer blade section 110*b* is designed as a pitch-controlled blade. This means that the inner blade section 110*a* is aerodynamically designed to operate at a large range of angles of attack, and is designed to enter stall when the wind speed at the blade becomes too high. (Turbulence generated by the stall-controlled section will prevent the lifting force acting on the rotor.)

As the outer blade section 110*b* is designed as a pitch-controlled blade, the aerodynamic design can be optimised for operation within a short range of angles of attack. Such operation may be controlled by a controller module (not shown) present at the turbine location, or the turbine operation may be remotely controlled by a control centre.

Figure 3:
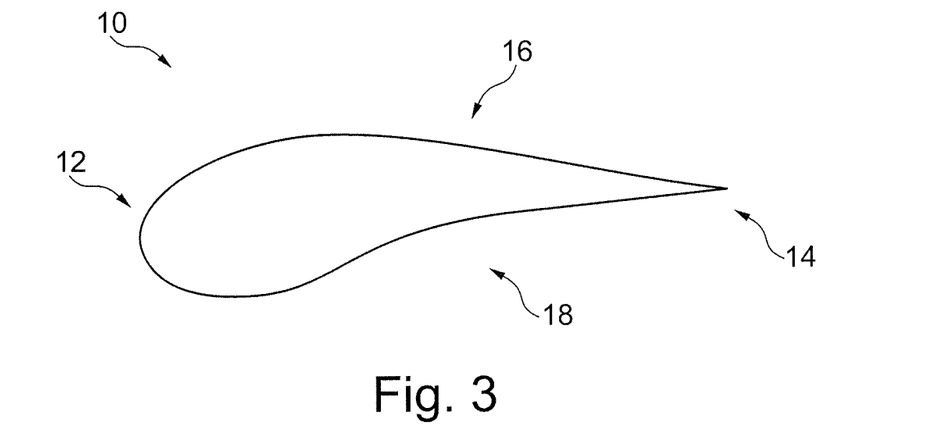
FIG. 3 is a cross-sectional view of an example of a stall-controlled blade profile.

FIG. 3 shows an example of a sample airfoil profile indicated at 10, suitable for use in a stall-controlled blade profile. The profile comprises a leading edge 12, a trailing edge 14, an upper suction side 16 and a lower pressure side 18. A stall-controlled blade has a relatively slight camber (or curvature), with an emphasis on providing a smooth post-stall power curve. Stall-controlled blades have a relatively high maximum lift coefficient (CLmax), and are designed to operate with reasonable efficiency across a relatively wind range of wind speeds and associated angles of attack.

Examples of suitable stall-controlled blade profiles include, but are not limited to, NACA-63-2XX series blade profiles.

Figure 4:
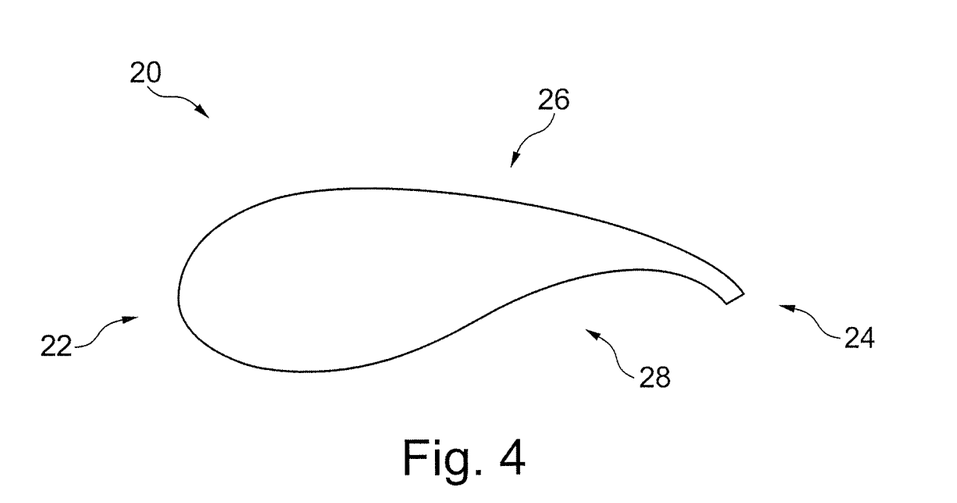
FIG. 4 is cross-sectional view of an example of a pitch-controlled blade profile.

FIG. 4 shows an example of a sample airfoil profile indicated at 20, suitable for use in a pitch-controlled blade profile. The profile comprises a leading edge 22, a trailing edge 24, an upper suction side 26 and a lower pressure side 28. A pitch-controlled blade has a relatively large camber (or curvature), and is optimised for high-efficiency operation within a short range of angles of attack.

Examples of suitable pitch-controlled blade profiles include, but are not limited to, NACA-63-6XX series blade profiles.

The energy production of a blade section is proportional to the product of the maximum lift coefficient (CLmax) of the blade section and the length of the chord at the blade section (the chord being the imaginary straight line joining the trailing edge and the centre of curvature of the leading edge of the cross-section of an airfoil). Preferably, the blade profiles of the inner and outer blade sections are selected such that the value of the [(CLmax)×(Chord)] for the inner blade section at the pitch junction is at least 20% greater than the [(CLmax)× (Chord)] of the outer blade section.

This discontinuity in the [(CLmax)×(Chord)] values of the two blade sections provides for a blade configuration which is adapted for use an appropriate control method to pitch the outer blade sections out of the wind at nominal power output, wherein the inner blade section continues to produce increasing lift (and therefore increasing power generation) as wind speed increases beyond the wind speed at which the blade produces nominal rated power. The [(CLmax)×(Chord)] variation aims to ensure that stall of the inner blade sections is suppressed for as long as possible, in order to provide for increasing power production of the inner blade sections for substantially all of the nominal power output wind speed range.

It will be understood that the chord lengths can be measured at the respective ends of the inner and outer blade sections at the pitch junctions. In another approach, the chord length may be measured as the average chord for a portion of the blade section adjacent the pitch junction, e.g. the average chord for the area of the blade section within 1 meter, 5 meters, 10 meters, etc. of the pitch junction.

Additionally or alternatively, at least one high-lift device can be provided on the inner blade section to increase the lift characteristics and suppress the stall of the inner blade section. Examples of suitable high-lift devices include, but are not limited to: a vortex generator, a gurney flap, a spoiler, a leading-edge slat/slot, boundary-layer control devices. Furthermore, the wind turbine blade may comprise at least one stall fence provided at the pitch junction, to provide for disruption of any lengthwise cross flow of air, and to improve blade performance.

In a further enhancement of the blade, or an alternative blade design, the blade is configured such that the inner blade section has a greater chord value than the outer blade section. In one embodiment, the distal outer portion of the inner blade section comprises a first average chord length, and the distal outer portion of the outer blade section comprises a second average chord length, the first chord length being greater than the second chord length. Preferably, the first average chord length is at least twice as long as the second average chord length. The distal outer portion in each case comprises the length of the blade section furthest away from the root end of the blade along the longitudinal length of the blade. Preferably, the distal outer portion refers to the outer ⅔ of the blade sections in question, e.g. for a 30 meter blade section, the outer 20 meters. Such a configuration can be seen for example in FIG. 2, wherein the distal section of the inner blade section 110*a* comprises a noticeably larger chord than the distal section of the outer blade section 110*b*.

As a result, the inner blade section has a higher total lift compared with the outer blade section, and accordingly is able to produce more lift at higher wind speeds than the other blade section, allowing for proportionally more power to be produced by the inner blade section at higher speeds. Such an arrangement allows for the blade root moments experienced by a wind turbine to be reduced during turbine operation.

As the difference between the profile shapes of the inner and outer blade sections 110*a*, 110*b* may be significant, a coupling connection may be required between the blade sections to allow the sections to couple to a pitch system 112 used in the blade 108. It will be understood that the pitch system 112 is normally circular in construction, but the blade 108 may comprise an aerodynamic profile at the pitch system 112, including a leading edge and a trailing edge.

With reference to the embodiment shown in FIG. 2, the blade 108 may comprise a transition zone (indicated at 113), provided at the pitch junction end of the outer blade section 110*b*. The transition zone 113 can be dimensioned to taper from the pitch controlled aerodynamic profile of the outer blade section 110b, to a profile suitable for coupling to the pitch system 112 (e.g. a profile having a wider cross-section than the outer blade section 110b to accommodate the relatively wide pitch system 112).

In such an embodiment, it will be understood that the discontinuity between aerodynamic profiles may be examined from the end of the outer blade section 110b adjacent the transition zone 113, i.e. the cross-section of the outer blade section 110b seen at the boundary point A indicated on FIG. 2.

It will also be understood that a transition zone may be additionally or alternatively provided at the pitch junction end of the inner blade section 110a, where the inner blade section 110a of the blade 108 tapers for coupling to a relatively narrow pitch system mounted to a pitch controlled outer blade section.

Further alternatively, it will be understood that a blade may be provided having first and second transition zones, one each for the inner and outer blade sections.

It will be understood that such a transition zone 113 is not essential for the operation of the invention, and the pitch junction ends of the inner and outer blade sections 110a, 110b may be suitable for coupling directly to the pitch system 112, in which case the discontinuity in profiles between the blade sections can be seen at the pitch system 112.

Figure 5:
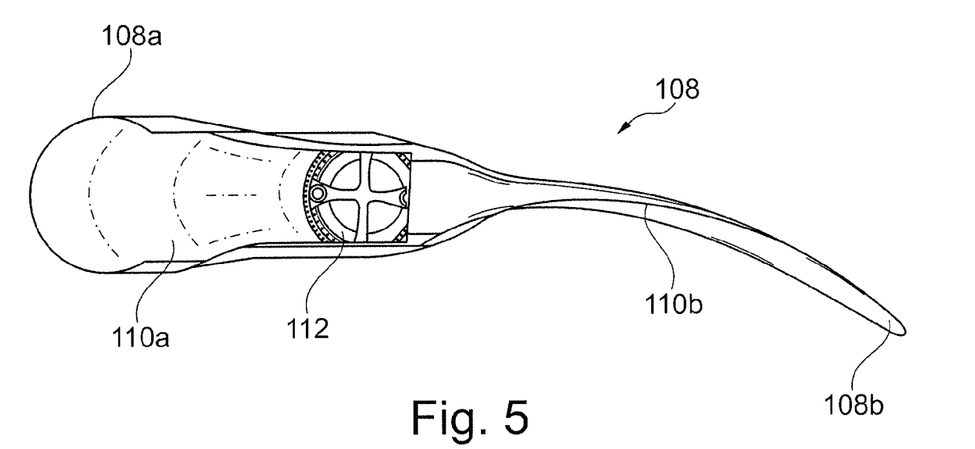
FIG. 5 is a perspective view of a partial pitch rotor blade according to an aspect of the invention showing a partial cross-section of an inner blade section.

With reference to FIG. 5, a partial cross-sectional perspective view of a rotor blade 108 according to the invention is indicated, looking from the trailing edge at the root end 108a towards the leading edge and the tip end 108b. From this view, the pitch system 112 can be seen provided inside the interior of the rotor blade 108 body. The outer blade section 110b comprises a swept profile, such that the tip end 108b of the blade 108 is back swept to improve blade aerodynamic performance.

Figure 6:
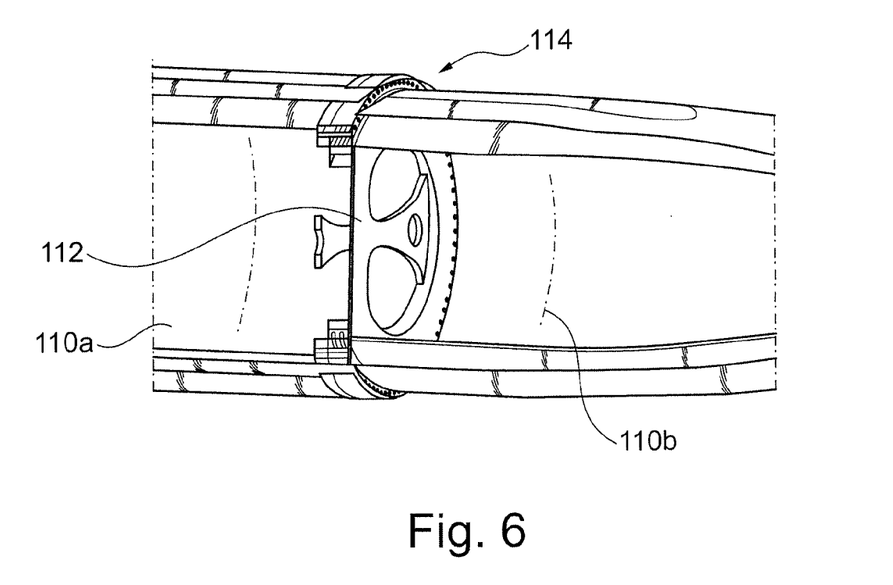
FIG. 6 is an enlarged cross-sectional view of the blade of FIG. 5.

With reference to FIG. 6, an enlarged cross-sectional view of the pitch junction of FIG. 5 is illustrated. In the embodiment of FIG. 6, a discontinuity or jump (indicated at 114) is seen between the end of the inner blade section 110a and the end of the outer blade section 110b, indicating the relative change in the blade profiles for each section. It will be understood that other variations of blade profiles may be used, for example longer chord length, increased camber, etc.

Preferably, the rotor blades are controlled such that a wind turbine which produces nominal output power at a first wind speed WS1 will start to pitch the outer blade sections out of the wind for wind speeds above WS1, to reduce the power capture of the outer blade sections, and correspondingly reduce the blade root moments for wind speeds above this first wind speed WS1. The hybrid design of the partial pitch rotor blade, wherein the outer blade section is designed for pitch control and the inner blade section designed for stall control, ensures that the inner blade section will operate with increasing power capture for increasing wind speeds, and therefore can be used to produce proportionally more power as wind speeds increase above WS1.

As more power in being produced by the inner blade sections (provided adjacent to the rotor hub), then the moment arm experienced by the wind turbine structure is reduced, resulting in decreased loading in the wind turbine structure. Accordingly, wind turbine structure design can be readjusted to cope with reduced loading and fatigue, resulting in reduced construction costs and requirements.

Preferably, the surface area of the inner blade section is substantially equivalent to the surface area of the outer blade section, and the longitudinal length of the inner blade section is approximately equal to half the longitudinal length of the outer blade section.

While prior art blades would seek to control the turbine operation by pitching the outer blade sections to provide constant output power from these outer blade sections, in the present invention the continually increasing power capture from the inner blade sections allows for a transition of power production from the outer blade section to the inner blade section as wind speed increases, thereby reducing the blade root moments.

As proportionally more power is being produced by the inner blade sections, accordingly the blade moment is reduced, due to the shorter moment arm.

A control method suitable for use with such a blade is described in the co-pending U.S. patent application Ser. No. 13/456,694, which is hereby incorporated by reference.

The invention is not limited to the embodiment described herein, and may be modified or adapted without departing from the scope of the present invention.

What is claimed is:

1. A partial pitch wind turbine blade of at least 35 meters length, the blade comprising:
   an inner blade section;
   an outer blade section coupled to said inner blade section at a pitch junction, said outer blade section operable to pitch relative to said inner blade section, wherein
   said inner blade section comprises a first blade profile for a stall-controlled aerodynamic blade with a first aerodynamic profile having a first maximum lift coefficient (CLmax1) and a first cord (Ch1) at the end facing said pitch junction and wherein
   said outer blade section comprises a second blade profile for a pitch-controlled aerodynamic blade with a second aerodynamic profile having a second maximum lift coefficient (CLmax2) and a second cord (Ch2) at the end facing said pitch junction, and
   wherein said blade comprises a discontinuity between said first and second blade profiles between said pitch junction, which discontinuity is such that [(CLmax1)×(Ch1)] is at least 20% greater than [(CLmax2)×(Ch2)].

2. A partial pitch blade as claimed in claim 1, wherein said inner blade section is designed to enter stall for a greater angle of attack than said outer blade section.

3. A partial pitch blade as claimed in claim 1, wherein the inner blade section has greater cord length than the outer blade section.

4. A partial pitch blade as claimed in claim 1, wherein the profile of said outer blade section has a greater camber than the profile of said inner blade section at the blade section ends facing each other.

5. A partial pitch blade as claimed in claim 1, wherein at least one high-lift device is provided on said inner blade section to suppress stall of said inner blade section.

6. A partial pitch blade as claimed in claim 5, wherein said at least one high-lift device is selected from one or more of the following: a vortex generator, a gurney flap, a spoiler, a leading-edge slat/slot, boundary-layer control devices.

7. A partial pitch blade as claimed in claim 1, wherein the wind turbine blade comprises at least one stall fence provided at said pitch junction.

8. A partial pitch blade as claimed in claim 1, wherein the surface area of said inner blade section is substantially equivalent to the surface area of said outer blade section.

9. A partial pitch blade as claimed in claim 1, wherein the longitudinal length of said inner blade section is approximately equal to half the longitudinal length of said outer blade section.

10. A partial pitch blade as claimed in claim 1, wherein taken from the root of the blade along the longitudinal length of the blade, the distal ⅔ of said inner blade section has an average chord length of C1 and the distal ⅔ of said outer blade section has an average chord length of C2, and wherein the length of C1 is greater than or equal to twice the length of C2.

11. A partial pitch blade as claimed in claim 1, wherein the blade comprises at least one transition zone provided between said first and second blade profiles at said pitch junction.

12. A partial pitch blade as claimed in claim 11, wherein said outer blade section comprises an outer tip end and an inner pitch end, and wherein the blade further comprises an outer blade transition zone provided between the inner pitch end of said outer blade section and said pitch junction, wherein the blade comprises a discontinuity between the first blade profile at said pitch junction and the second blade profile at the inner pitch end of said outer blade section.

13. A partial pitch blade as claimed in claim 11, wherein said inner blade section comprises an outer pitch end and an inner root end, and wherein the blade further comprises an inner blade transition zone provided between the outer pitch end of said inner blade section and said pitch junction, wherein the blade comprises a discontinuity between the first blade profile at the outer pitch end of said inner blade section and the second blade profile at the pitch junction.

14. A partial pitch wind turbine comprising:

a wind turbine tower;

a nacelle provided at the top of said tower; and at least two partial pitch rotor blades as claimed in claim 1, said rotor blades provided on a rotor hub located at said nacelle, wherein when the outer blade sections are unpitched relative to the inner blade sections of said partial pitch rotor blades said wind turbine is operable to generate nominal output power at a first wind speed, and wherein the inner blade sections are designed to enter stall at a second wind speed greater than said first wind speed.

15. A partial pitch wind turbine as claimed in claim 14, wherein the wind turbine further comprises a controller, the controller operable to pitch said outer blade sections out of the wind for wind speeds above said first wind speed, as the power capture of said inner blade sections increases between said first wind speed and said second wind speed and said controller is operable to pitch said outer blade sections out of the wind to maintain nominal output power for wind speed above said first wind speed.

\* \* \* \* \*